(12) United States Patent
Smugeresky et al.

(10) Patent No.: US 8,232,750 B2
(45) Date of Patent: Jul. 31, 2012

(54) BROAD TURNDOWN RATIO TRACTION DRIVE

(75) Inventors: Craig Steven Smugeresky, Foothill Ranch, CA (US); Derrin Lynn Olischefski, Trabuco Canyon, CA (US)

(73) Assignee: Quantum Fuel Systems Technologies Worldwide, Inc., Troy, MI (US)

( * ) Notice: Subject to any disclaimer, the term of this patent is extended or adjusted under 35 U.S.C. 154(b) by 305 days.

(21) Appl. No.: 12/712,877

(22) Filed: Feb. 25, 2010

(65) Prior Publication Data

US 2011/0204829 A1 Aug. 25, 2011

(51) Int. Cl.
*H02P 5/00* (2006.01)
(52) U.S. Cl. ............... 318/66; 318/34; 318/67; 318/68; 318/69; 318/62
(58) Field of Classification Search .................. 318/66, 318/34, 67–69, 62–65
See application file for complete search history.

(56) References Cited

U.S. PATENT DOCUMENTS

| 5,359,154 | A  | * | 10/1994 | Tsukasa et al. | 177/145 |
| 6,242,873 | B1 | * | 6/2001  | Drozdz et al.  | 318/139 |
| 6,919,700 | B2 | * | 7/2005  | Maslov et al.  | 318/400.2 |
| 6,945,893 | B2 | * | 9/2005  | Grillo et al.  | 475/5 |
| 7,893,636 | B2 | * | 2/2011  | Lantz et al.   | 318/105 |
| 8,089,226 | B2 | * | 1/2012  | Matsutani et al. | 318/68 |

* cited by examiner

*Primary Examiner* — Walter Benson
*Assistant Examiner* — David Luo
(74) *Attorney, Agent, or Firm* — Baker Hostetler, LLP; Mark Krietzman

(57) ABSTRACT

A traction drive system comprising a plurality of electric motors selectably connected to a main shaft by engagement devices, each motor or combination of motors provides distinct performance characteristics along a broad spectrum of performance characteristics; and a method of managing a traction drive system including sensing physical parameters of the fraction drive system, selecting an electric motor having well-suited performance profile based on pre-selected criteria against which the sensed parameter is compared, and engaging one or more of the corresponding motors to the main shaft.

7 Claims, 6 Drawing Sheets

BROAD TURNDOWN RATIO TRACTION DRIVE

BACKGROUND

Field

This disclosure relates to vehicle drivetrain systems. In particular, this disclosure relates to systems and methods for managing a plurality of motors of a vehicle.

SUMMARY

According to some exemplary implementations, disclosed is a traction drive system, comprising: a main shaft; a first electric motor having a first performance profile and a first shaft connected to the main shaft; and a second electric motor having a second performance profile distinct from the first performance profile and a second shaft selectably connected to the main shaft by an engagement device. The engagement device is configured to connect the second shaft to the main shaft when a sensed parameter satisfies a criterion. The criterion may define a range of motor speeds (RPM) at which the second motor provides at least as much output as any other motor of the traction drive system. The criterion may define a range of output that the second motor is capable of providing to satisfy a demand placed on the traction drive system at a greater efficiency than any other motor of the traction drive system. The first performance profile and the second performance profile together provide a cumulative performance profile that exceeds the limits of each of the first performance profile and the second performance profile.

According to some exemplary implementations, disclosed is a traction drive system, comprising: a first electric motor having a first performance profile and a first shaft selectably connected to a main shaft by a first engagement device; and a second electric motor having a second performance profile distinct from the first performance profile and a second shaft selectably connected to the main shaft by a second engagement device. The first engagement device is configured to connect the first shaft to the main shaft when a sensed parameter satisfies a first criterion, the first criterion defining at least one of: (a) a range of motor speeds (RPM) at which the first motor provides at least as much output as any other motor of the traction drive system and (b) a range of output that the first motor is capable of providing to satisfy a demand placed on the traction drive system at a greater efficiency than any other motor of the traction drive system. The second engagement device is configured to connect the second shaft to the main shaft when a sensed parameter satisfies a second criterion, the second criterion defining at least one of: (a) a range of motor speeds (RPM) at which the second motor provides at least as much output as any other motor of the traction drive system and (b) a range of output that the second motor is capable of providing to satisfy a demand placed on the traction drive system at a greater efficiency than any other motor of the traction drive system. Further disclosed is a third electric motor having a third performance profile distinct from each of the first performance profile and the second performance profile and a third shaft selectably connected to the main shaft by a third engagement device when a sensed parameter satisfies a third criterion, the third criterion defining at least one of: (a) a range of motor speeds (RPM) at which the third motor provides at least as much output as any other motor of the traction drive system and (b) a range of output that the third motor is capable of providing to satisfy a demand placed on the traction drive system at a greater efficiency than any other motor of the traction drive system. The first shaft, the second shaft, the third shaft, and the main shaft are axially aligned. The second motor is disposed between the third motor and the main shaft. The third shaft is concentrically disposed within at least a portion of the second motor and at least a portion of the second shaft.

According to some exemplary implementations, disclosed is a method, comprising: sensing a parameter of a drivetrain system; if the parameter satisfies a first criterion, providing output from a first electric motor to a main shaft of the drivetrain system, the first motor having a first performance profile; and if the parameter satisfies a second criterion, providing output from a second electric motor to the main shaft of the drivetrain system, the second motor having a second performance profile distinct from the first performance profile. The second criterion may define a range of motor speeds (RPM) at which the second motor provides at least as much output as any other motor of the traction drive system. The second criterion may define a range of output that the second motor is capable of providing to satisfy a demand placed on the traction drive system at a greater efficiency than any other motor of the traction drive system. The first criterion may define a range of motor speeds (RPM) at which the first motor provides at least as much output as any other motor of the traction drive system. The first criterion may define a range of output that the first motor is capable of providing to satisfy a demand placed on the traction drive system at a greater efficiency than any other motor of the fraction drive system. The method may further comprise: providing output from the first motor comprises operating a first engagement device whereby a first shaft of the first motor is connected to the main shaft. Providing output from the second motor comprises operating a second engagement device whereby a second shaft of the second motor is connected to the main shaft. The method may further comprise: if the parameter satisfies a third criterion, providing output from a third electric motor to the main shaft of the drivetrain system, the third motor having a second performance profile.

DRAWINGS

The above-mentioned features of the present disclosure will become more apparent with reference to the following description taken in conjunction with the accompanying drawings wherein like reference numerals denote like elements and in which.

DETAILED DESCRIPTION

According to some exemplary implementations, a plurality of motors may be provided and selectably engaged and disengaged from a vehicle driveline. In some instances, engagement and disengagement may be based on variable powertrain loading. According to some exemplary implementations, the vehicle may benefit from the plurality of motors providing a broad range of performance characteristics without requiring a traditional transmission configuration to produce performance tailored to the variable and changing needs of the vehicle.

Figure 1:
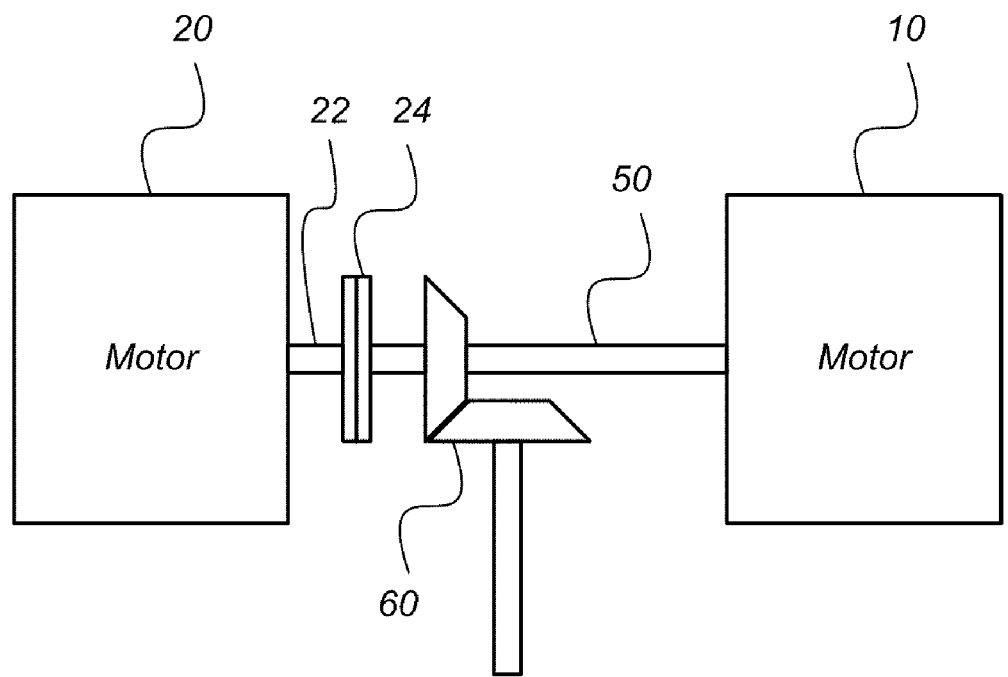
FIG. 1 shows a block diagram of a drivetrain system having a plurality of motors.

According to some exemplary implementations, as shown in FIG. 1, first motor 10 may be configured to provide mechanical power to main shaft 50. As shown in FIG. 1, first motor 10 is axially aligned with main shaft 50 and has an output that is directly connected to main shaft 50. First motor 10 may also be configured to interface with main shaft 50 through other alignments, such as with an indirect connection (not shown) to main shaft 50. According to some exemplary implementations, main shaft 50 may be connected to other components of a drivetrain system. For example, main shaft 50 may be directly or indirectly connected to gear set 60, differentials, axles, wheels, etc.

According to some exemplary implementations, as shown in FIG. 1, second motor 20 is configured to selectably provide mechanical power to main shaft 50. As shown in FIG. 1, second motor 20 has second shaft 22 powered by second motor 20. Second engagement device 24 may be provided between second shaft 22 and main shaft 50 to selectably transfer power from second shaft 22 to main shaft 50.

According to some exemplary implementations, engagement devices of the present disclosure (e.g., first engagement device 14, second engagement device 24, third engagement device 34, etc.) may be any device that selectably alters the relationship between one shaft (e.g., first shaft 12, second shaft 22, third shaft 32, etc.) and another shaft (e.g., main shaft 50). For example, engagement devices of the present disclosure may be one or combinations of a clutch (dog clutch, cone clutch, safety clutch, overrunning clutch, centrifugal clutch, semi-centrifugal clutch, hydraulic clutch, electromagnetic clutch, etc.) a freewheel, a torque limiter, a mechanical diode, etc. Those of ordinary skill in the art will understand the present disclosure to encompass other devices that satisfy the same and similar purposes.

According to some exemplary implementations, second engagement device 24 may be configured to engage second shaft 22 relative to main shaft 50 to provide transfer of torque or other power there between. According to some exemplary implementations, second engagement device 24 may be configured to disengage second shaft 22 from main shaft 50 when main shaft 50 rotates faster than second shaft 22.

According to some exemplary implementations, each motor may have a performance profile parameters and characteristics thereof. For example, a performance profile may define a motor's torque, output power, energy consumption, RPM, turndown ratio, etc. A performance profile may include an envelope of the motor's lower limit and upper limit for any given parameter. A performance profile of each motor may be distinct, unique, similar, or common relative to other motors of the system. Those of ordinary skill may use multiple measuring metrics to define and/or fine tune or revise a performance profile.

According to some exemplary implementations, the performance profile of each motor may be based on structural or physical characteristics thereof. For example, motors may be at least one a synchronous electric motor and an asynchronous electric motor.

According to some exemplary implementations, individual performance profiles may be combined by simultaneously operation of multiple motors to provide a cumulative performance profile of the combination of motors. As used herein, a cumulative performance profile may include the input and output capabilities of a given combination of motors when used simultaneously or in tandem.

According to some exemplary implementations, a plurality of motors may be employed to selectably exploit separate performance profiles of each motor under given conditions. Motors may be employed separately, in series, simultaneously, in tandem, or combinations thereof to provide a broad range of selectable profiles.

Figure 2:
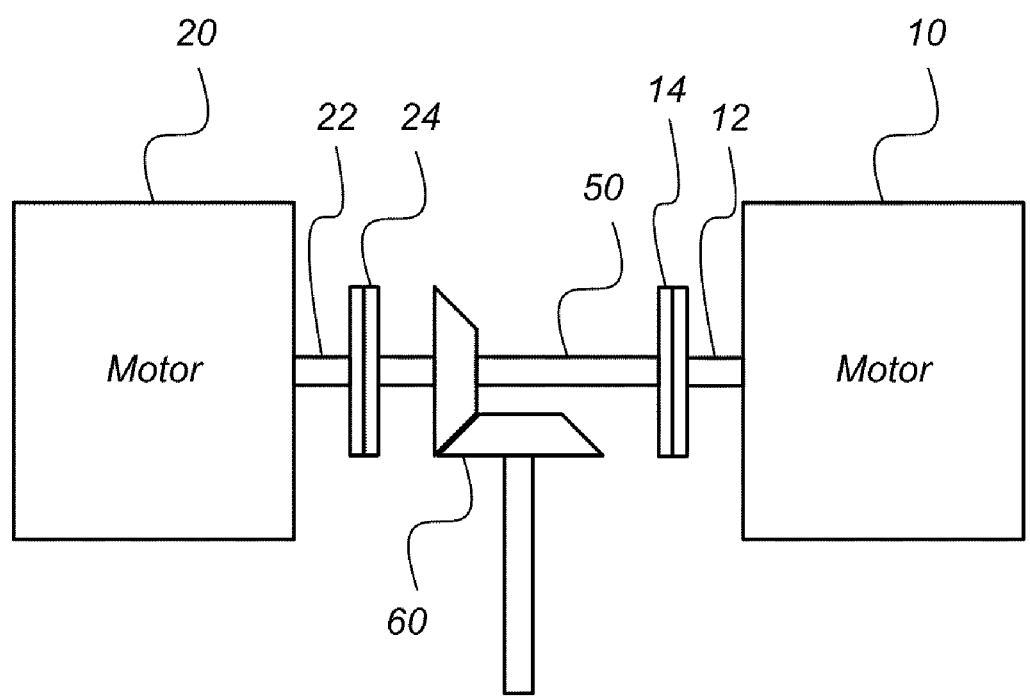
FIG. 2 shows a block diagram of a drivetrain system having a plurality of motors.

According to some exemplary implementations, as shown in FIG. 2, first motor 10 may be configured to selectably provide mechanical power to main shaft 50. As shown in FIG. 2, first motor 10 may have first shaft 12 powered by first motor 10. First engagement device 14 may be provided between first shaft 12 and main shaft 50 to selectably transfer power from first shaft 12 to main shaft 50.

Figure 3:
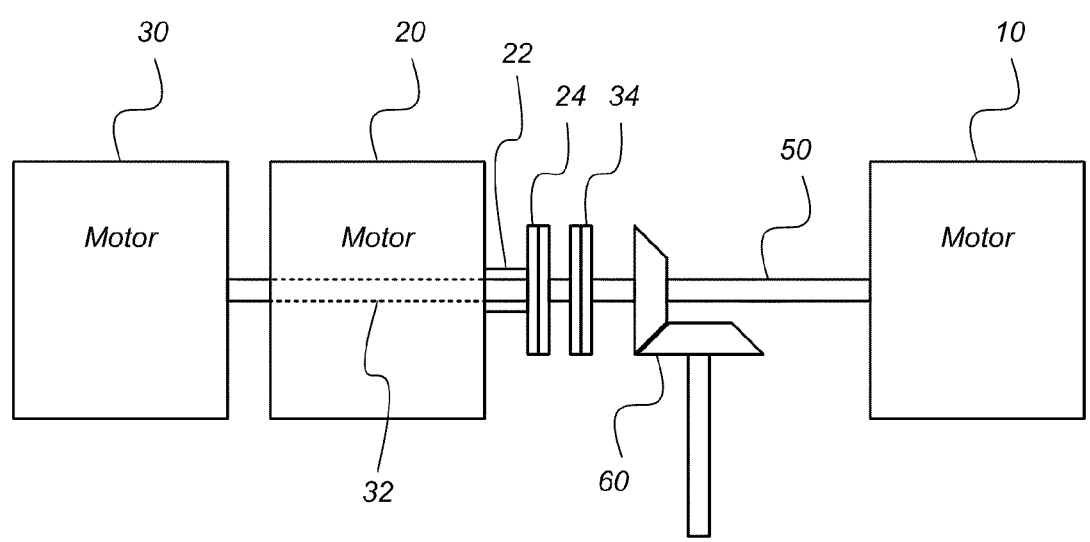
FIG. 3 shows a block diagram of a drivetrain system having a plurality of motors.

According to some exemplary implementations, as shown in FIG. 3, third motor 30 may be configured to selectably provide mechanical power to main shaft 50. As shown in FIG. 3, third motor 30 may have third shaft 32 powered by third motor 30. Third engagement device 34 may be provided between third shaft 32 and main shaft 50 to selectably transfer power from third shaft 32 to main shaft 50.

According to some exemplary implementations, as shown in FIG. 3, third motor 30 may be disposed distally from main shaft 50, such that second motor 20 is disposed between third motor 30 and main shaft 50. As shown in FIG. 3, where second motor 20, third motor 30, and main shaft 50 are coaxially disposed, third shaft 32 may be disposed coaxially within and concentrically through second motor 20. Likewise, third shaft 32 may be disposed coaxially within and concentrically through second shaft 22, wherein it passes though second shaft 22. Third shaft 32 may be disposed opposite first shaft 12, main shaft 50, gear set 60, or concentric with one or more of the same.

According to some exemplary implementations, any number of motors may be used according to the principles disclosed herein, as shall be recognized by those having skill in the relevant art. A plurality of motors may be coaxially or otherwise disposed on one or both sides of main shaft 50, with coaxially concentric shafts provided as needed.

According to some exemplary implementations, a control system (not shown) may be provided to manage the operation of the traction drive system. For example, a control system may store operational settings (e.g., predetermined criteria), sense operating parameters (e.g., torque, speed, power, driver demand, etc.), determine actions to be taken, respond to sensed parameters, and manage components of the system.

The control system may include components to facilitate such operation, such as processors, memory, temperature sensors, electrical circuitry, and control relationships with components of the exhaust gas recirculation circuit. For example, sensors may be provided at various portions of the system and throughout the vehicle to sense parameters.

According to some exemplary implementations, for each motor, a known performance profile may be associated. The performance profile may include output characteristics, torque, power, motor speed (RPM), efficiency, turndown ratio, power consumption, etc.

Figure 5A:
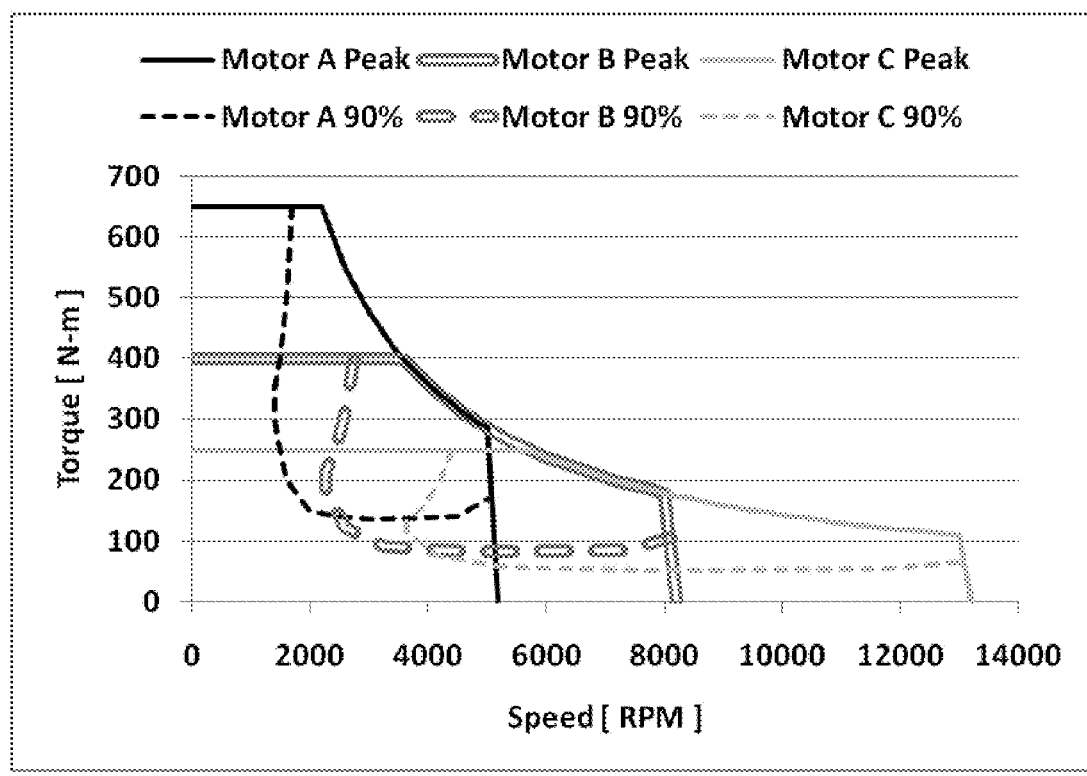
FIG. 5A shows a performance diagram comparing torque (N-m) against speed (RPM) for three motors.
Figure 5B:
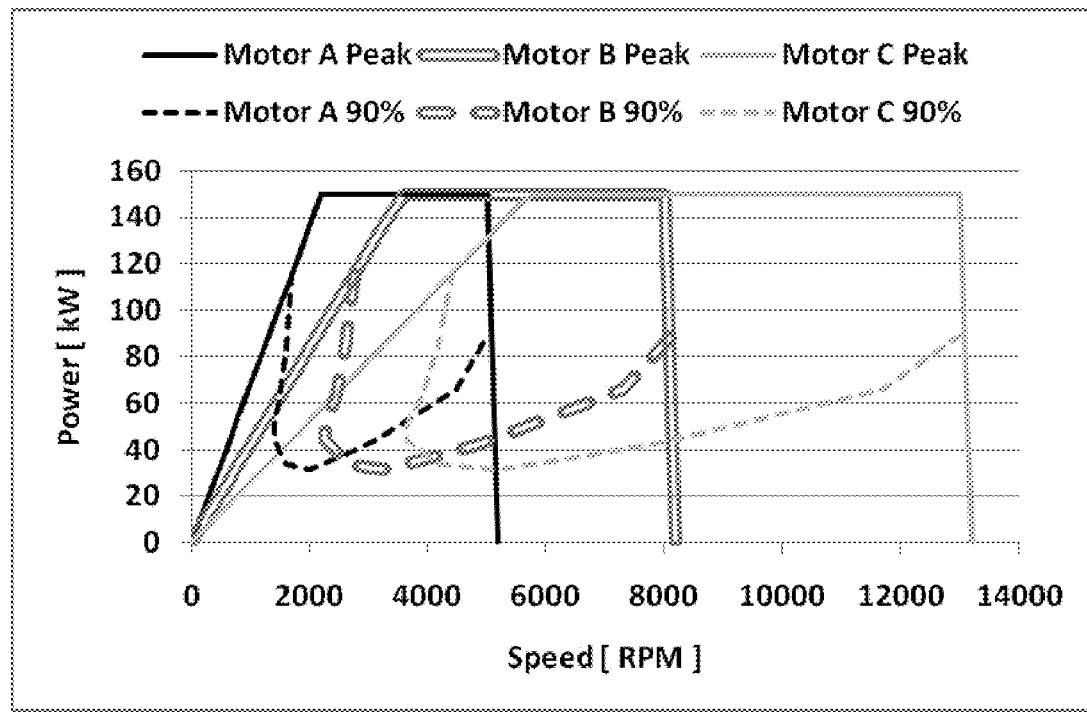
FIG. 5B shows a performance diagram comparing power (kW) against speed (RPM) for three motors.

According to some exemplary implementations, as shown in FIGS. 5A and 5B, efficient operation can be maintained over a wide range of motor speeds by utilizing various combinations of motors. For example, a motor designed for lower speed operation can output a desired power efficiently at low speeds, while a motor designed for higher speeds can operate at said power efficiently at higher speeds.

A performance profile may be defined by output torque (N-m) at given speeds (RPM) of a motor. As shown in FIG. 5A, both peak torque and 90% torque across given speeds are shown for each of three motors (Motor A, Motor B, and Motor C). Each motor may have a peak torque at low speeds (0-2000 RPM). Among the three, Motor A has the greatest peak torque in this range; however, at higher speeds the peak torque of Motor A is comparable to that of Motor B (at about 4000 RPM) and it approaches zero at even higher speeds (at about 5000 RPM). Motor B has a peak torque that exceeds that of Motor C until it tapers at higher speeds and eventually approaches zero (at about 8000 RPM). Similar trends are shown at a given percentage of torque of each motor, such as 90% of peak torque (as shown in FIG. 5A). A predetermined criterion governing the selectable use of a given motor may correspond to the motor speed at which the given motor provides at least as much torque as any other motor at that speed.

As used herein, a predetermined criterion may be basis of comparison for a sensed parameter and a designation that indicates when the state of at least one motor of a drivetrain system is controlled. For example, upon satisfaction of a predetermined criterion, one or more motors may be made operable, idle, engaged, disengaged, or otherwise have a state thereof controlled. A criterion may be predetermined, static, constant, dynamic, user-controlled, or determinable based on at least one algorithm.

According to some exemplary implementations, a performance profile may be defined by output power (kW) at given speeds (RPM) of a motor. As shown in FIG. 5B, both peak power and 90% power across given speeds are shown for each of three motors (Motor A, Motor B, and Motor C). Each motor may have a speed or range of speeds at which it provides a relatively greater amount of power. Power may be lower at speeds both greater than and lower than this speed or range of speeds. As shown in FIG. 5B, each motor may have a distinct speed or range of speeds at which this relatively greater amount of power is provided. Similar trends are shown at a given percentage of power of each motor, such as 90% of peak power (as shown in FIG. 5B). A predetermined criterion governing the selectable use of a given motor may correspond to the motor speed at which the given motor provides at least as much power as another motor at that speed.

Figure 6A:
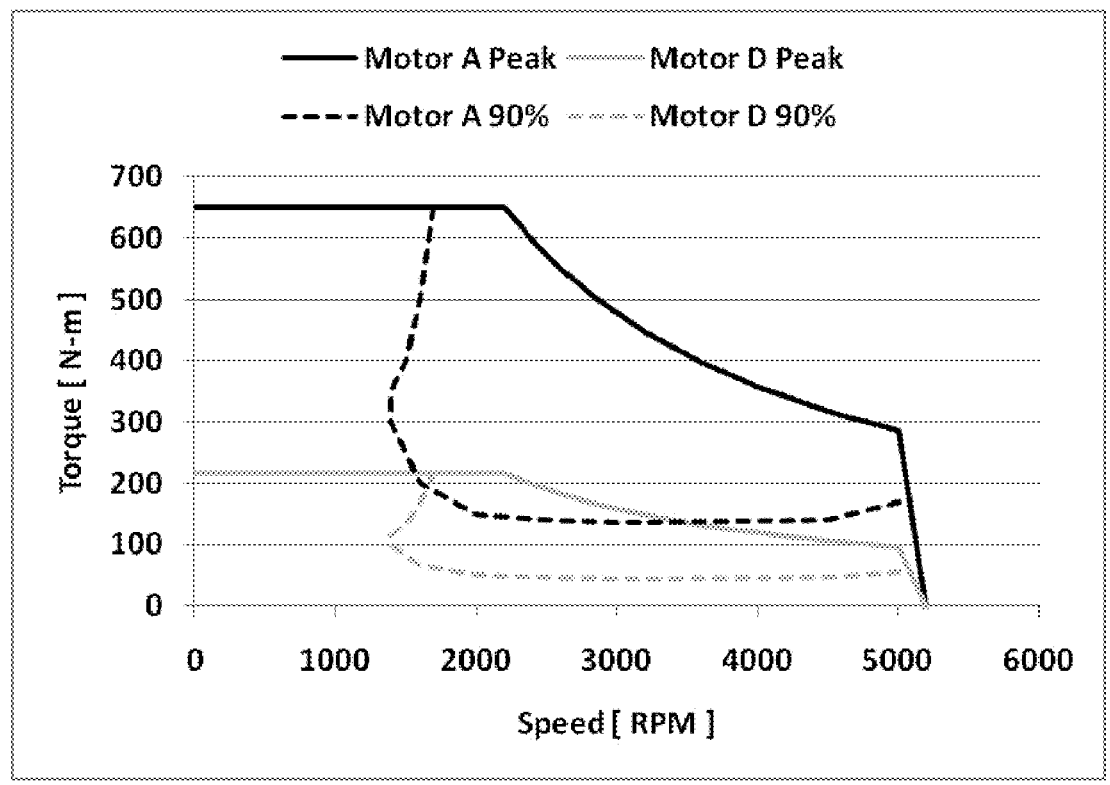
FIG. 6A shows a performance diagram comparing torque (N-m) against speed (RPM) for two motors.
Figure 6B:
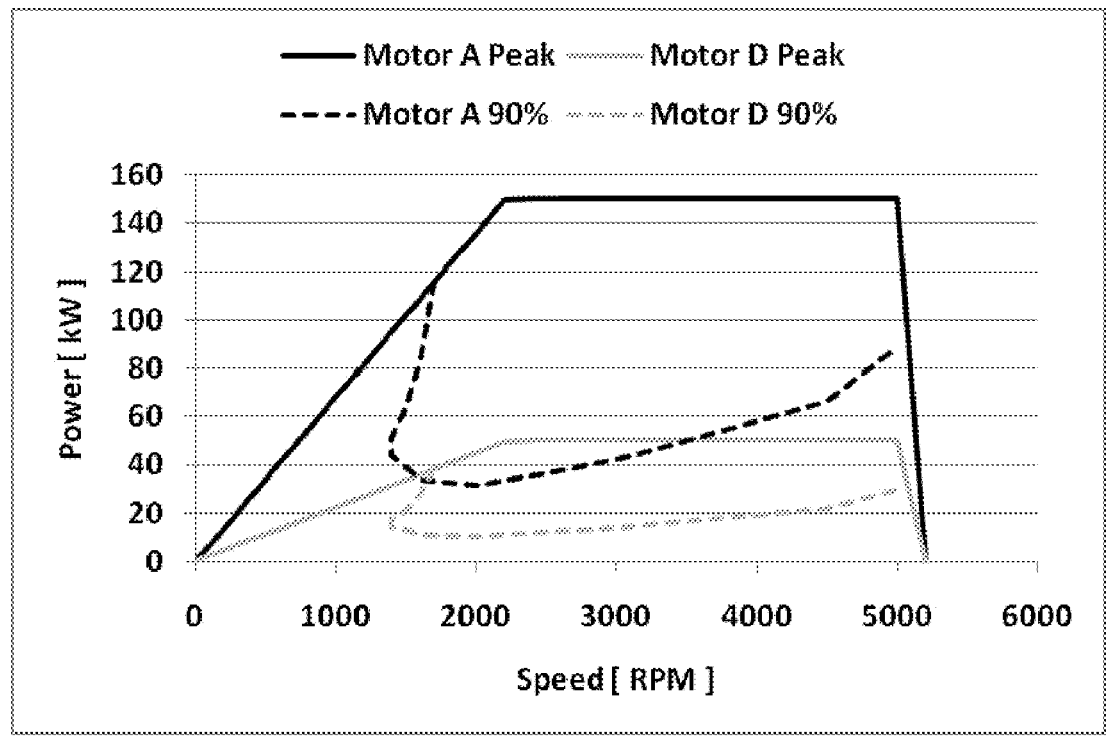
FIG. 6B shows a performance diagram comparing power (kW) against speed (RPM) for two motors.

According to some exemplary implementations, as shown in FIGS. 6A and 6B, efficient operation can be maintained over a wide range of power outputs by using multiple motors of similar speed capability but different designed power outputs. For example, a lower power motor can be engaged for efficient low power operation (e.g., cruise), and a higher power motor can be engaged as needed for higher power performance (e.g., acceleration, going up grades, high speeds, etc.).

FIG. 6A illustrates the use of both peak torque (N-m) and 90% torque across given speeds (RPM) for each of two motors (Motor A and Motor D) as at least a portion of a performance profile. Each motor may have a peak torque at low speeds with declining torque capabilities with increasing speed. As shown in FIG. 6A, both Motor A and Motor D may approach zero at about the same speed (as opposed to different speeds, as shown in FIG. 5A). Within this range, Motor A may consistently or at least usually provide greater torque capabilities than Motor B. As shown in FIG. 6A, the difference between Motor A and Motor D may be a factor of proportionality. Similar trends are shown at a given percentage of torque of each motor, such as 90% of peak torque (as shown in FIG. 5A). Such a configuration may be useful to determine which motor should be used based on the demand placed on the system (e.g., driver demand). A predetermined criterion governing the selectable use of a given motor may correspond to the amount of demand or other predictable or measurable needs of a vehicle for torque output. For example, a predetermined criterion may define a range of output torque (N-m) that a given motor is capable of providing to satisfy a demand placed on the traction drive system. In addition, the predetermined criterion may also recognize the efficiency or relative efficiency (compared to other motors) at which a given motor may satisfy a demand.

According to some exemplary implementations, as shown in FIG. 6B, both peak power (kW) and 90% power across given speeds (RPM) are shown for each of two motors (Motor A and Motor D). As with FIG. 6A, the difference between Motor A and Motor D may be a factor of proportionality. A predetermined criterion governing the selectable use of a given motor may correspond to the amount of driver demand or other predictable or measurable needs of a vehicle for power output. For example, a predetermined criterion may define a range of output power (kW) that a given motor is capable of providing to satisfy a demand placed on the traction drive system. In addition, the predetermined criterion may also recognize the efficiency or relative efficiency (compared to other motors) at which a given motor may satisfy a demand.

According to some exemplary implementations, each motor has a distinct performance profile, and a criterion may be determined corresponding to the selected conditions under which operation of the given motor is preferred, desirable, necessary or otherwise selectable. For example, a criterion may be a threshold against which a sensed parameter of the system may be compared to determine whether a given motor should be used. The sensed parameter may include driver demand, vehicle speed, motor speed (RPM), efficiency, power consumption, grade of incline, load on one or more motors, braking operation, etc. For example, the sensed parameter may include those of a currently operating motor used to determine whether another motor should be used in combination with or in place of the currently operating motor. By further example, the measurement of output (e.g., torque and speed) versus input (e.g., current and voltage) of a currently operating motor can be constantly compared to performance maps, such as seen in FIGS. 5A, 5B, 6A, and 6B. Motors may be engaged and/or disengaged as required to maintain optimum drive efficiency. By further example, a motor might also be reaching its maximum design speed and therefore need to be disengaged from the driveline while another, designed for higher speed operation, may take over. By further example, driver demand, expressed as a torque request translated from pedal position (i.e., driver demand), may exceed the maximum attainable output torque for the currently engaged motor and another may be engaged to meet the demand.

According to some exemplary implementations, where each motor has a distinct performance profile, the criterion for determining whether a given motor is used may be distinct. For example, criteria defining ranges against which sensed parameters are compared may be overlapping, separate, contiguous, etc. According to some exemplary implementations, criteria may be predetermined based on known performance profiles of each of the plurality of motors provided and desired operation thereof. Parameters may be sensed during operation of the system.

For example, a system may be provided with a plurality of motors to provide variable performance at different vehicle speeds. A first motor may be provided with greater output during acceleration from low vehicle speeds, and a second motor may be provided with greater output at high vehicle speeds. The sensed parameter may be the speed of the vehicle and/or driver demand, which may be compared to at least one criterion distinguishing the preferred operating conditions of the first motor from the preferred operating conditions of the second motor. The result may facilitate use of the first motor during acceleration from low vehicle speeds and use of the second motor during maintenance of the vehicle at high speeds.

By further example, a system may be provided with a plurality of motors to maximize efficiency of any or all motors in use. The goal of such a system may be to operate motors at high efficiency levels. Efficiency of a motor may be known as a function of torque (N-m), power (kW), and speed (RPM) of the motor, as shown in FIGS. 5A, 5B, 6A, and 6B. Each motor may have a known set of conditions under which a certain level of efficiency may be achieved (e.g., at least 90% efficiency), and each set of conditions may be distinct for each motor. For example, first motor 10 achieve at least 90% efficiency under different parameters of torque (N-m), power (kW), and speed (RPM) than the parameters under which second motor 20 achieves at least 90% efficiency. Thus, the parameters under which first motor 10 achieves at least 90% efficiency may define a first criterion, and the parameters under which second motor 20 achieves at least 90% efficiency may define a second criterion.

According to some exemplary implementations, one or more shafts of one or more motors may simultaneously be connected to main shaft 50 to provide cumulative output to main shaft 50. First motor 10 and second motor 20 may each have a first performance profile and a second performance profile, respectively. When operated simultaneously in connection with main shaft 50, first motor 10 and second motor 20 may provide a cumulative performance profile. The cumulative performance profile may have known performance characteristics. Furthermore, the cumulative performance profile may have a corresponding cumulative criterion corresponding to the range of sensed parameters at which simultaneous operation of first motor 10 and second motor 20 may be desirable, preferred, necessary, etc. In like manner, other combinations of motors may yield other cumulative performance profiles and cumulative criterion.

Figure 4:
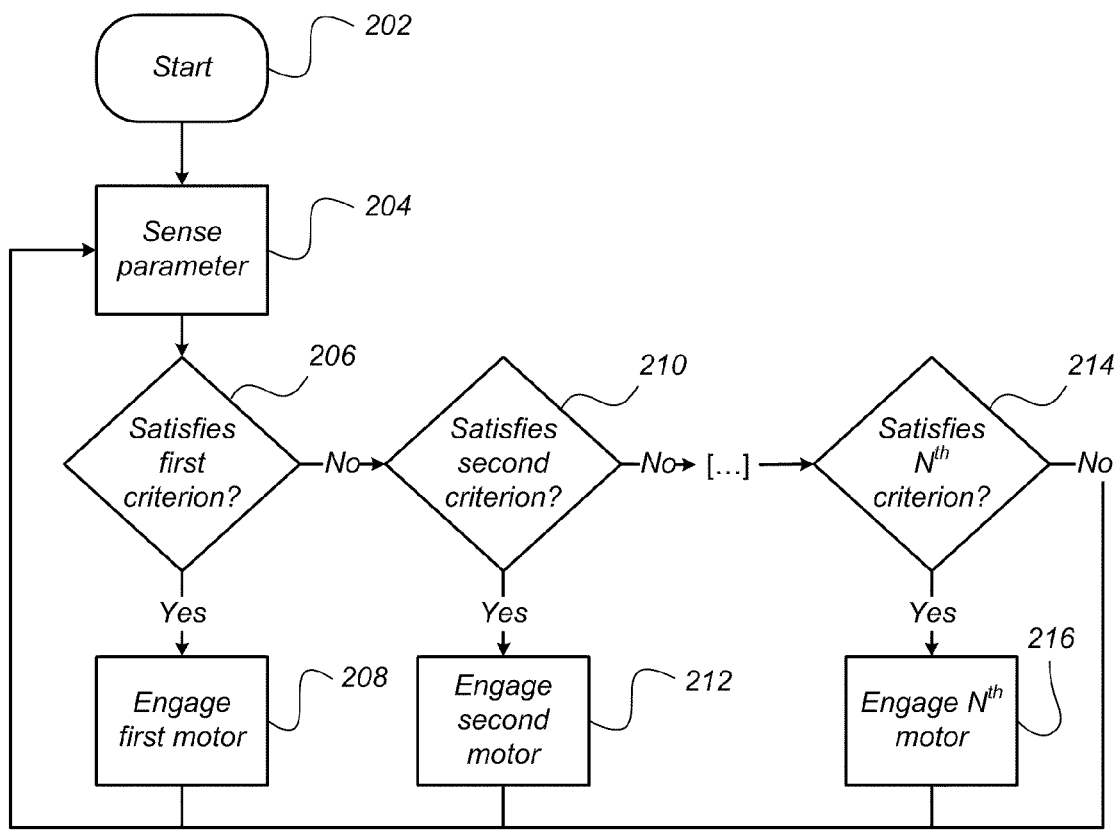
FIG. 4 shows a flow diagram for operating a drivetrain system.

According to some exemplary implementations, a method of operating a drivetrain system is disclosed herein. As shown in FIG. 4, a method may be started at operation 202. In operation 204, a parameter may be sensed, as disclosed herein. In operation 206, the sensed parameter may be compared to a first criterion. If the sensed parameter satisfies the first criterion, then first motor 10 may be engaged in operation 208. This may occur by operating first engagement device 14, whereby first shaft 12 is connected to main shaft 50.

If the sensed parameter does not satisfy the first criterion, then the sensed parameter may be compared to the second criterion in operation 210. If the sensed parameter satisfies the second criterion, then second motor 20 may be engaged in operation 212. This may occur by operating second engagement device 24, whereby second shaft 22 is connected to main shaft 50. According to some exemplary implementations, engagement of second motor 20 may be exclusive (i.e., coupled with disengagement of first motor 10) or cumulative (i.e., coupled with continued engagement of first motor 10), according to the desired outcome.

According to some exemplary implementations, the number of criteria against which the sensed parameter is compared depends on the number of motors or combinations of motors available. As shown in FIG. 4, operation 214 demonstrates that N number of criteria may be applied, corresponding to N number of motors or combinations of motors that may be engaged in operation 216.

According to some exemplary implementations, each action taken by the system may be followed by the subsequent execution of operation 204, in which a parameter is again sensed or updated.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A traction drive system, comprising:
   a first electric motor having a first performance profile and a first shaft selectably connected to a main shaft by a first engagement device configured to connect the first shaft to the main shaft when a sensed parameter satisfies a first criterion, the first criterion defining at least one of: (a) a range of motor speeds (RPM) at which the first motor provides at least as much output as any other motor of the traction drive system and (b) a range of output that the first motor is capable of providing to satisfy a demand placed on the traction drive system at a greater efficiency than any other motor of the traction drive system; and,
   a second electric motor having a second performance profile distinct from the first performance profile and a second shaft selectably connected to the main shaft by a second engagement device.

2. A traction drive system, comprising:
   a first electric motor having a first performance profile and a first shaft selectably connected to a main shaft by a first engagement device; and,
   a second electric motor having a second performance profile distinct from the first performance profile and a second shaft selectably connected to the main shaft by a second engagement device configured to connect the second shaft to the main shaft when a sensed parameter satisfies a second criterion, the second criterion defining at least one of: (a) a range of motor speeds (RPM) at which the second motor provides at least as much output as any other motor of the traction drive system and (b) a range of output that the second motor is capable of providing to satisfy a demand placed on the traction drive system at a greater efficiency than any other motor of the fraction drive system.

3. A traction drive system, comprising:
   a first electric motor having a first performance profile and a first shaft selectably connected to a main shaft by a first engagement device;
   a second electric motor having a second performance profile distinct from the first performance profile and a second shaft selectably connected to the main shaft by a second engagement device; and,
   a third electric motor having a third performance profile distinct from each of the first performance profile and the second performance profile and a third shaft selectably connected to the main shaft by a third engagement device when a sensed parameter satisfies a third criterion, the third criterion defining at least one of: (a) a range of motor speeds (RPM) at which the third motor provides at least as much output as any other motor of the traction drive system and (b) a range of output that the third motor is capable of providing to satisfy a demand placed on the fraction drive system at a greater efficiency than any other motor of the traction drive system.

4. The traction drive system of claim 3, wherein the first shaft, the second shaft, the third shaft, and the main shaft are axially aligned.

5. The traction drive system of claim 3, wherein the second motor is disposed between the third motor and the main shaft.

6. The traction drive system of claim 5, wherein the third shaft is concentrically disposed within at least a portion of the second motor and at least a portion of the second shaft.

7. A method, comprising:
   sensing a parameter of a drivetrain system;
   if the parameter satisfies a first criterion, providing output from a first electric motor to a main shaft of the drivetrain system, the first motor having a first performance profile;
   if the parameter satisfies a second criterion, providing output from a second electric motor to the main shaft of the drivetrain system, the second motor having a second performance profile distinct from the first performance profile; and,
   if the parameter satisfies a third criterion, providing output from a third electric motor to the main shaft of the drivetrain system, the third motor having a second performance profile.

* * * * *